Nov. 11, 1924.

B. F. F. MERVILLE 1,514,981

MOUNTING OF MOTOR CAR BODIES ON THEIR CHASSIS

Filed March 20, 1924   2 Sheets-Sheet 1

Fig.1

INVENTOR
Blaise François Félix Merville
BY
R.S. Waters
ATTORNEY

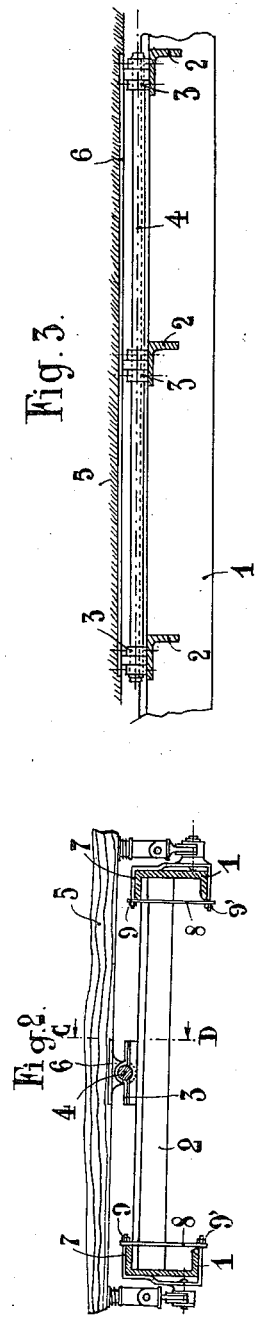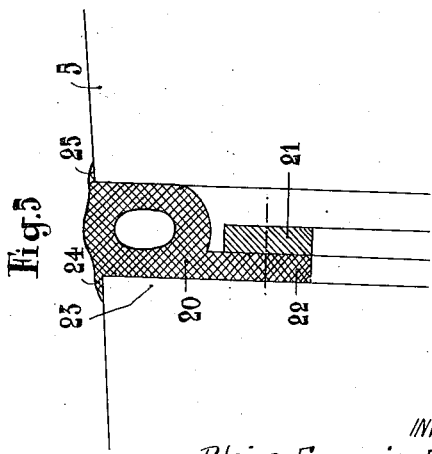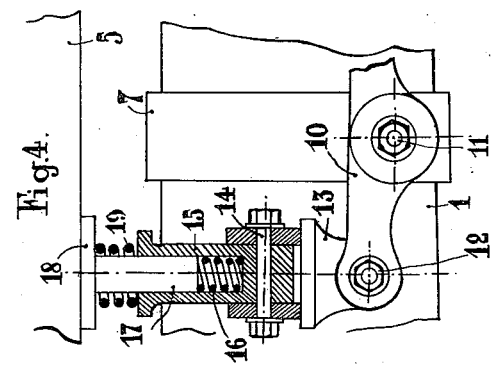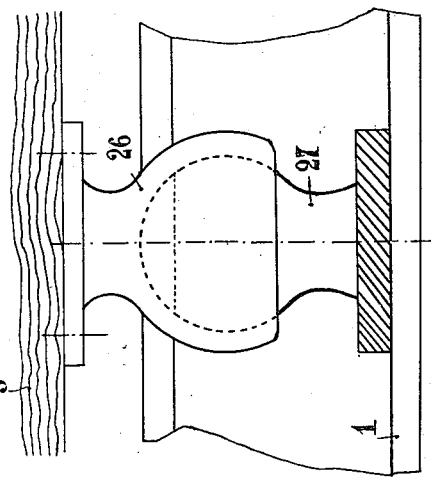

Patented Nov. 11, 1924.

1,514,981

UNITED STATES PATENT OFFICE.

BLAISE FRANÇOIS FÉLIX MERVILLE, OF LEVALLOIS-PERRET, FRANCE.

MOUNTING OF MOTOR-CAR BODIES ON THEIR CHASSIS.

Application filed March 20, 1924. Serial No. 700,655.

*To all whom it may concern:*

Be it known that I, BLAISE FRANÇOIS FÉLIX MERVILLE, a citizen of the Republic of France, residing at Levallois-Perret, Seine, France, have invented new and useful Improvements in the Mounting of Motor-Car Bodies on Their Chassis, of which the following is a specification.

This invention has for its object to provide an improved mounting of motor car bodies upon their chassis which constitutes between such car bodies and their chassis an elastic connection which gives an absolutely smooth suspension that moderates all shocks experienced by the chassis.

This improved mounting is constituted as follows:

A certain amount of vertical space is provided between the car chassis and the car body, and the connection between the two is effected by means of a central axle supporting the car body, fixed to the chassis by ordinary bearings or any other means or by means of transverse angle bars fixed to the chassis. In this way the car body is allowed to have a certain amount of pivotal motion in relation to the chassis. A suitable elastic device is interposed between the car body and the chassis for the purpose of receiving and deadening vibration.

In order to enable the following description to be more clearly understood, reference is to be had in the accompanying drawings which illustrate by way of example the manner of mounting the car body on the chassis according to this invention. In these drawings:

Figure 1 illustrates the general arrangement of a motor car having its car body mounted on its chassis in accordance with the present invention.

Figure 2 is a vertical cross section taken along the line *a—b* of Figure 1.

Figure 3 is a vertical section taken along the line *c—d* of Figure 2.

Figure 4 is a sectional detail view of the elastic device interposed between the chassis and the car body.

Figure 5 is a section illustrating the joint provided between the dash-board ledge on which the bonnet rests, and the front portion of the car body; and Figure 6 illustrates a constructional modification of the invention designed more particularly for small light cars.

On the motor chassis 1 (Figs. 2 and 3) there are fixed two or three transverse angle bars 2 that carry bearings 3 for supporting an axle-pin 4 secured to the car body 5. This axle-pin is connected to the car body by means of a horizontal plate 6 attached to the latter by any suitable means. The car body is thereby enabled to oscillate on its central axis in accordance with the vibration due to the road surface.

One or more elastic devices (for instance of the spring type, such as that shown in detail in Figure 4) are provided at the side of the car body for the purpose of assuring the equilibrium of the car body.

In order to avoid perforating the chassis for the passage of attaching bolts, and thus diminishing its strength, the parts of the said elastic devices are fixed in the following manner:

On the longitudinal frame members of the chassis there is placed a channel piece 7 (Fig. 2) fitting the top and the underside of the chassis. This channel piece is screw-threaded on its two ends which are connected together by a metal plate 8 held in place by nuts 9 and 9' on said screwthreaded ends. This channel piece carries an axle pin 11 on which can rock an arm 10 on the ends of which are articulated members 13 which are in their turn articulated by means of a pivot-pin 14 to a cylinder 15.

In the interior of this cylinder is a spring 16 which is compressed by a piston 17 that is fixed by its head 18 to the car body 5 by any suitable means.

Another spring 19, which comes in aid of the action of the spring 16, prevents the piston head 18 from coming in contact with the upper end of the cylinder 16.

It is to be understood that this construction of the elastic device interposed between the car body and the chassis is given solely by way of example, and that any other equivalent device may be employed.

It is also to be understood that, according to the size and weight of the car body a greater or lesser number of such elastic devices may be provided, and that such devices may be employed singly and not necessarily coupled together in pairs. These devices may be arranged outside or inside, or both inside and outside the chassis according to requirements.

In view of the play thus allowed to the car body, means must be provided for preventing the front portion of the car body from rubbing against the dashboard ledge upon which the bonnet rests. For this purpose an improved joint (shown in detail in Fig. 5) is provided between the dashboard ledge and the front portion of the car body. This improved joint consists of a tube of rubber or other suitable elastic material held against the dashboard ledge 23 by a collar 21 under which the flat portion 22 of the said tube is slipped. This collar is fixed to the dashboard ledge 23 by screws, bolts or any other suitable means. This rubber tube constitutes a joint which is so arranged that its edges 24 and 25 rest respectively upon the dashboard ledge and the sloping front portion of the car body.

The car body is thus able to oscillate and press upon the tube 20 without any noise or damage.

In the modification illustrated in Figure 6, an ordinary ball and socket joint is employed of a size suited to the dimensions of the vehicle that is to be fitted with the car body. The upper part 26 of the joint is fixed to the car body by any suitable means, the lower part 27 of the said joint being fixed to the chassis likewise by any suitable means.

By means of this ball and socket joint the car body is allowed to move in all directions relatively to the chassis, and its motion is deadened by the provision of elastic means, such as those hereinbefore described, suitably interposed between the car body and the chassis.

It is to be understood that the hereinbefore described constructional forms are given solely by way of examples and that the constructional arrangement thereof may be modified in any way without departing from the nature of this invention.

Having now particularly described and ascertained the nature of my said invention and in what manner the same is to be performed, I declare that what I claim is:

1. A mounting of a motor car body on its chassis, whereby the two are elastically connected to each other in such a manner as to assure a good flexible and noiseless suspension of the car body, this mounting comprising a central axle which is attached to the car body and is capable of rocking in bearings carried by transverse angle bars attached to the chassis; elastic devices interposed on the sides of the car body between the said sides and the chassis; and an elastic joint between the front part of the car body and the dash-board ledge on which the bonnet rests for the purpose of preventing noise and damage.

2. A mounting as claimed in claim 1, wherein the elastic joint consists of a rubber tube of suitable shape attached to the dash-board ledge, and against which the front portion of the car body bears.

In testimony whereof I have signed my name to this specification.

BLAISE FRANÇOIS FÉLIX MERVILLE.